United States Patent [19]
Osterlund et al.

[11] Patent Number: 5,247,646
[45] Date of Patent: * Sep. 21, 1993

[54] COMPRESSED DATA OPTICAL DISK STORAGE SYSTEM

[75] Inventors: Steven W. Osterlund, North Kingstown; Michael G. Johnson, Wakefield, both of R.I.

[73] Assignee: Aquidneck Systems International, Inc., North Kingstown, R.I.

[*] Notice: The portion of the term of this patent subsequent to Jul. 23, 2008 has been disclaimed.

[21] Appl. No.: 733,475

[22] Filed: Jul. 22, 1991

Related U.S. Application Data

[63] Continuation-in-part of Ser. No. 207,590, Jun. 16, 1988, Pat. No. 5,034,914, which is a continuation-in-part of Ser. No. 37,749, Apr. 13, 1987, Pat. No. 4,775,969, which is a continuation-in-part of Ser. No. 863,564, May 15, 1986, abandoned.

[51] Int. Cl.$^5$ .................... G06F 13/00; G11B 7/013
[52] U.S. Cl. ...................... 395/425; 395/275
[58] Field of Search ............... 395/425, 275; 341/87

[56] References Cited

U.S. PATENT DOCUMENTS

| | | | |
|---|---|---|---|
| 3,400,371 | 9/1968 | Amdahl et al. | 364/200 |
| 3,400,372 | 9/1968 | Beausoleil et al. | 364/200 |
| 3,629,860 | 12/1971 | Capozzi | 340/172.5 |
| 4,001,883 | 1/1977 | Strout et al. | 360/48 |
| 4,089,027 | 5/1978 | Grigoletti | 360/72 |
| 4,094,013 | 6/1978 | Hill et al. | 365/234 |
| 4,229,808 | 10/1980 | Hui | 365/234 |
| 4,310,883 | 1/1982 | Clifton et al. | 364/200 |
| 4,321,635 | 3/1982 | Tsuyuguchi | 360/72.2 |
| 4,398,227 | 8/1983 | Anderson | 360/71 |
| 4,467,421 | 8/1984 | White | 364/200 |
| 4,486,870 | 12/1984 | Pettigrew et al. | 369/43 |
| 4,490,747 | 12/1984 | Yokoyama | 358/296 |
| 4,496,997 | 1/1985 | Ohtsuki | 360/13 |
| 4,531,166 | 7/1985 | Anderson | 360/73 |
| 4,535,439 | 8/1985 | Satoh et al. | 369/275 |
| 4,541,019 | 9/1985 | Precourt | 360/15 |
| 4,545,044 | 10/1985 | Satoh et al. | 369/32 |
| 4,562,577 | 12/1985 | Glover et al. | 371/38 |
| 4,587,643 | 5/1986 | Monen et al. | 369/32 |
| 4,633,393 | 12/1986 | Rundell | 364/200 |
| 4,680,653 | 7/1987 | Ng et al. | 360/72.2 |
| 4,682,318 | 7/1987 | Busby | 369/59 |
| 4,775,969 | 10/1988 | Osterlund | 369/53 |
| 4,791,623 | 12/1988 | Deiotte | 369/59 |
| 4,929,946 | 5/1990 | O'Brien et al. | 341/87 |
| 5,034,914 | 7/1991 | Osterlund | 395/425 |
| 5,113,512 | 5/1992 | Miki et al. | 395/425 |
| 5,155,835 | 10/1992 | Belsan | 395/425 |

*Primary Examiner*—Dale M. Shaw
*Assistant Examiner*—D. Dinh
*Attorney, Agent, or Firm*—Pennie & Edmonds

[57] ABSTRACT

An improved optical disk data storage system method are disclosed. In an optical disk storage system, a data compression device is interposed between a host computer and an optical disk controller to permit data storage and retrieval operations on an optical disk to occur at a faster rate than would otherwise be possible. Data is compressed when it is received by the optical disk controller and is decompressed before it is sent to the host computer. In this way data may be efficiently stored on an optical disk while providing plug compatibility with a host computer designed to store and retrieve data on a magnetic media data storage device.

26 Claims, 2 Drawing Sheets

COMPRESSED DATA OPTICAL DISK STORAGE SYSTEM

CROSS REFERENCE TO RELATED APPLICATIONS

This application is a continuation-in-part U.S. Pat. application Ser. No. 07/207,590, filed June 16, 1988, now U.S. Pat. No. 5,034,914, which is a continuation-in-part of Ser. No. 37,749, filed Apr. 13, 1987, now U.S. Pat. No. 4,775,969, which is a continuation-in-part of Ser. No. 863,564, filed May 15, 1986, abandoned.

BACKGROUND OF THE INVENTION

This invention relates to an optical disk storage system and, more particularly, to a faster, more efficient embedded directory technique for compressing and storing or retrieving data on or from an optical disk to permit rapid data storage and retrieval.

U.S. Pat. No. 5,034,914 discloses an optical disk system which incorporates a new and improved embedded directory technique for storing and retrieving data on or from an optical disk. This technique allows an optical disk storage device to emulate a magnetic media storage device, such as a tape drive, while maintaining plug compatibility with a host computer.

In that patent, a high-level directory is created which relates a file to a number of embedded directories interspersed with data on an optical disk, and written to the disk substantially simultaneously with the data. The embedded directories each provide an index to a number of associated data records, all part of a single corresponding file. The fact that the embedded directories are interspersed with the data reduces the number of long head seeks required to access a particular record. The embedded directories are written onto the disk immediately following the data records to which they correspond. The high-level directory is written onto a predetermined location on the disk, so that it can be located reliably; entries are added to the high-level directory as data is written onto the disk.

The above steps are accomplished by an optical disk controller unit interposed between a host computer and an optical disk storage system. The controller, which includes a microprocessor,
  (1) receives data transmitted from the host computer,
  (2) generates information for a high-level directory,
  (3) constructs embedded directory entries,
  (4) controls writing of the record data, and
  (5) writes a high-level directory entry, including a table of embedded directory disk addresses, onto the optical disk.

Relatively speaking, a significant amount of time is required for the optical disk system to store data upon or retrieve data from the optical disk. It is the slowest element of that system, and is the primary source of delay in storing and retrieving data. The greater the amount of data, the greater will be the amount of time required for the optical disk to complete its storage and retrieval tasks. In some cases this may lead to unacceptably slow rates of data storage and retrieval.

Thus, there is a need for an optical media storage device having a faster, more efficient technique for storing and retrieving large amounts of data. The present invention provides one such system to satisfy that need.

SUMMARY OF THE INVENTION

The present invention relates to an optical media data storage system which includes host interface means for connection to a host computer and having means for receiving a sequence of data storage commands to control a magnetic media data storage device from the host computer. Data compression means are used for compressing data transferred from the host interface means to the buffer memory means and for decompressing data transferred from the buffer memory means to the host interface means. The buffer memory means receives compressed data from the data compression means for optical media storage means and transmits compressed data which has been stored on the optical media storage means to the data compression means.

This system also includes optical media storage means for storing compressed data thereon, for storing compressed data received from the buffer memory means, and for supplying compressed data stored thereon to the buffer memory means, and microprocessor means for responding to the sequence of commands received from the host interface means and for controlling data storage and retrieval operations of the buffer memory means and the optical media storage means responsive to the sequence of commands.

All compressed data stored by the optical media storage means is stored in the buffer memory means prior to storage on the optical media storage means and prior to supply of the compressed data from the optical media storage means to the host computer. Also, while the compressed data is stored in the buffer memory means, prior to storage on the optical media storage means, the compressed data is organized by the microprocessor means into discrete groupings or segments, and at least one record directory is constructed. Each record directory consists of information pertaining to lengths of the compressed data records contained in a single discrete group or segment of compressed data.

In one embodiment, a high level directory is used for relating one or more record directories to a particular host data file constructed by the microprocessor means and stored in the buffer memory means. Thus, the segments, their associated record directories and the high-level directory are transferred from the buffer memory to the optical media storage means and stored thereon. Information contained in the record directory pertaining to the length of an individual data record is used to locate within a given data group or segment the particular record sought by the host computer. These segments are recorded onto the optical disk contiguously and interspersed with the record directories.

In another embodiment, the optical media storage means comprises an optical disk wherein compressed data supplied to the host interface means by the data compressing means is organized into a sequence of records by the microprocessor means, and information pertaining to individual data records which is contained within each record directory defines the length of at least one record of a single file which includes such records.

Another embodiment of the invention includes a method for storing compressed data on the systems described above where the following steps are performed in response to a request from a host computer to store a sequence of records:

the sequence of records is received at the host interface means and is transferred to the data compression means;

the sequence of records is compressed by the data compression means;

the sequence of compressed records is transferred to the buffer memory means;

the sequence of compressed records is stored in the buffer memory means;

a record directory is created in the buffer memory means;

the record directory is associated with up to a predetermined number of the compressed records; and the sequence of compressed records and the record directory are stored on the optical media storage device.

In response to a request from the host computer for the supply of one or more of the stored, compressed records, the present method can further include the steps of:

copying all of the compressed records associated with the record directory with which the particular record or records sought by the host are associated into the buffer memory means;

employing the record directory to locate the particular compressed record or records sought by the host;

transferring the compressed record or records sought to the data compression means;

decompressing the records or record sought in the data compression means;

transferring the decompressed records from the data compression means to the host interface means; and transferring the record or records sought to the host from the host interface means.

BRIEF DESCRIPTION OF THE DRAWINGS

The invention will be better understood with reference to the accompanying drawings, in which.

DETAILED DESCRIPTION OF THE INVENTION

Figure 1:
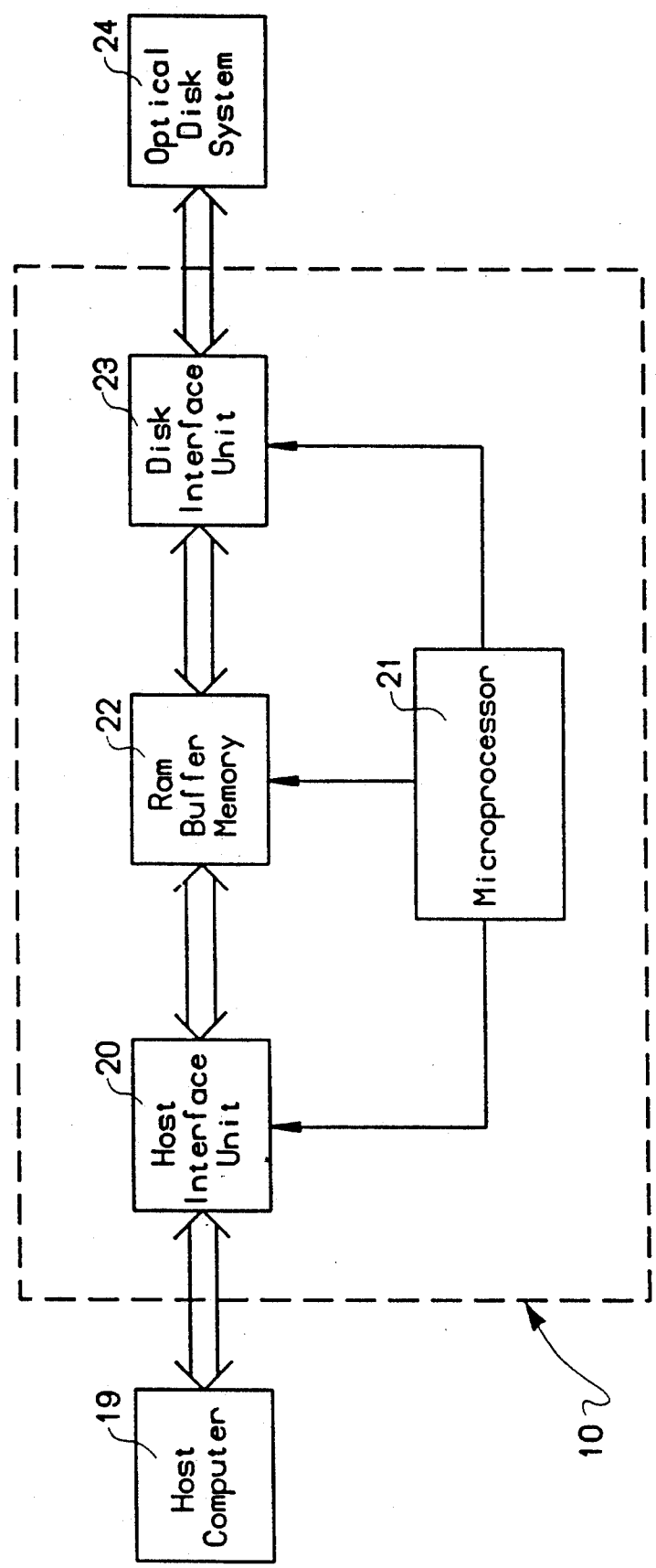
FIG. 1 is a system block diagram showing an optical disk controller for converting magnetic tape data from a host computer to data to be placed on an optical disk.

FIG. 1 shows an overview of the system described in U.S. Pat. No. 5,034,914, the content of which is expressly incorporated by reference herein.

As explained in that patent, computer 19 represents any computer, e.g., a Digital Equipment Company VAX 11/780, which provides an output for recording on various conventional peripheral data storage devices. Such devices include magnetic tape drives, e.g., a nine-track drive, whereby data is recorded on nine tracks of a tape. The computer 19 is thus operated as if to store conventional nine-track magnetic tape data. According to one aspect of the patent, such data is written onto an optical disk 24 rather than to a tape. In other words, communication between the optical disk and the computer 19 is "plug compatible" with the conventional communication between the computer 19 and a conventional tape drive. In this way, no modification of the host's operating system or software is required.

In order to accomplish this result, an optical disk controller unit 10 is interposed between the computer 19 (which may be substantially any host computer) and the optical disk system 24 (which may likewise be substantially any optical disk storage system). The controller 10 comprises a solid-state RAM buffer memory 22, typically of 1.5 Mbytes capacity, suitable host and disk interface units 20 and 23 respectively, and a microprocessor 21. The interface unit 20 by which the buffer 22 is connected to the computer 19 may implement a conventional tape interface that is, a conventional connection protocol. In this way the controller 10 is connected to the computer 19 as if it were a tape drive. For example, the tape interface may conform to the well-known "SCSI" (an international standard meaning "small computer systems interface") interface standard. Similarly, the interface 23 may be any unit suitable for coupling the buffer memory 22 to the optical disk system. For example, the SCSI is also suitable for many optical disk systems 24.

The computer 19, interfaces 20 and 23, buffer memory 22 and optical disk system 24 are connected by wide multibit data buses for fast data transfer; specifically, well-understood direct memory access (DMA) techniques are preferably employed to transfer data into and out of the buffer memory 22. By comparison, the microprocessor 21 is connected to the other elements of the controller 10 for control only.

The microprocessor 21 is controlled by software which is more fully described in U.S. Pat. No. 5,043,914. Generally, however, the software provides at least the following functions:

(1) Generates information for a high-level directory in microprocessor buffer memory consisting of disk addresses of embedded directory entries;

(2) Constructs embedded directory entries comprising record length information corresponding to the lengths of the records to be stored;

(3) Controls writing of the record data and embedded directory entries to the optical disk; and (4) Writes a high-level directory entry including a table of embedded directory disk addresses to the optical disk.

During reading operations, the high-level directory entry is read from the optical disk and used to determine the disk addresses of the embedded directory entries corresponding to the records which are sought. The embedded directory thus identified and the associated segment of data records are copied from the optical disk into the RAM buffer. The appropriate embedded directory entry is then employed to locate the desired data within the data segment.

The microprocessor 21 can be any suitable unit; for example, a Motorola model 68010 is suitable. For buffer memory 22, semiconductor memory also available from Motorola is suitable, but other conventional memory devices may be used. The SCSI interface 23 coupling the microprocessor 21 and optical disk 24 may be purchased from Applied Controlled Concepts Corporation, Milwaukee, Wis., as model AVME 1686, or similar units can be obtained from other vendors.

Figure 2:
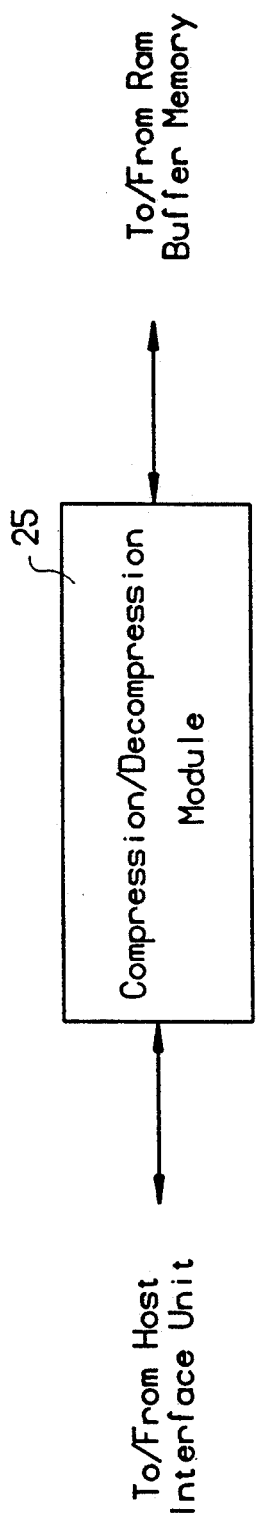
FIG. 2 is a block diagram showing a data compression/decompression module interposed between the host interface and the RAM buffer memory of FIG. 1.

According to the present invention, data storage and retrieval rates may be substantially increased over those of U.S. Pat. No. 5,034,914 by the use of a data compression/decompression module as shown in FIG. 2. This data compression module 25 is interposed between the optical disk controller unit 10 and the host computer 19. The data compression module 25 may be one of several different types, although a preferred unit is a STAC 9704 purchased from Stac Electronics, Inc., 5993 Avenida Encinas, Carlsbad, Calif., which uses a compression algorithm optimized for high speed byte-oriented file streams.

In an arrangement similar to that described in U.S. Pat. No. 5,034,914, the compression module 25, the host computer 19 and the optical disk controller 10 are connected by multibit data busses for fast data transfer. Specifically, direct memory access techniques are employed to transfer data between the host computer 19, the decompression module 25 and the controller 10.

In the present invention, after raw data formatted by the host 19 for storage on a magnetic media storage device has been received by the host interface unit 20, it is transmitted to the compression/decompression module 25 where said data is compressed. The compressed data is then stored on an optical disk storage medium as previously described in U.S. Pat. No. 5,034,914.

One advantage of the present invention is that, by compressing the data before it is sent to the optical disk, the total amount of data to be indexed and stored on the disk is reduced. As a result, substantially less time is required for the optical disk system 24 to store such data on an optical disk. In particular, when data is compressed and then written to the optical disk system 24 by the controller 10, the write task can be completed faster because the compression operation has reduced the amount of data which must be stored.

Similarly, when data is to be retrieved from the optical disk, the data is recovered from optical disk system 24 by the controller 10 and is then decompressed by the compression module 25 before being transmitted through the host interface means to the host computer 19. Accordingly, the read operation is also made more efficient by means of the present invention because the optical disk system 24 has less data to retrieve.

Significantly, the data compression module is used advantageously in the present invention by inserting it directly into the data stream immediately after it exits from the host interface unit after being received from the host. Since the compression module is capable of compressing and decompressing data with negligible delay, the device allows the optical disk storage device to have an overall faster rates of data storage and retrieval. This result is achieved because optical disk system 24 no longer slows down the system by storing redundant information.

As noted above, a further advantage of the present invention is that, since less data is written onto the optical disk via the compression module, there is less optical media required to store an equivalent amount of uncompressed data. Consequently, more data may be stored on the optical disk than would otherwise be possible.

While a preferred embodiment of the invention has been described, it will be understood by those of skill in the art that modifications and improvements to the above described exemplary embodiment of the invention may be made without departing from the spirit and scope thereof, as will be apparent to those skilled in the art, and the claims are intended to cover such modifications and improvements.

We claim:

1. An optical media data storage system comprising:
   host interface means for connection to a host computer and including means for receiving a sequence of data storage commands to control a magnetic media data storage device from said host computer;
   data compression means for compressing data transferred from said host interface means to said buffer memory means and for decompressing data transferred from said buffer memory means to said host interface;
   buffer memory means coupled to said data compression means for receiving compressed data which is to be stored on an optical media storage means, and for transmitting compressed data which has been stored on the optical media storage means to said data compression means;
   optical media storage means for storing compressed data thereon, for storing compressed data received from said buffer memory means, and for supplying compressed data stored thereon to said buffer memory means; and
   microprocessor means for responding to said sequence of commands received from said host interface means and for controlling data storage and retrieval operations of said buffer memory means and said optical media storage means responsive to said sequence of commands;
   a high level directory relating one or more record directories to a particular host data file constructed by said microprocessor means and stored in said buffer memory means;
   wherein all compressed data stored by said optical media storage means is stored in said buffer memory means prior to storage on said optical media storage means and prior to supply of said compressed data from said optical media storage means to said host computer;
   wherein while said compressed data is stored in said buffer memory means, prior to storage on said optical media storage means, said compressed data is organized by said microprocessor into discrete groupings or segments, and at least one record directory is constructed, each said record directory consisting of information pertaining to lengths of the compressed data records contained in a single discrete group or segment of compressed data;
   wherein said segments, their associated record directories and said high-level directory are transferred from said buffer memory to said optical media storage means and stored thereon;
   wherein said information contained in said record directory pertaining to length of an individual data record is used to locate within a given data group or segment the particular record sought by the host computer;
   wherein said segments are recorded onto said optical medium storage means contiguously and interspersed with said record directories.

2. The system of claim 1 wherein said buffer memory comprises solid-state random-access-memory (RAM) for efficient accessing and editing by said microprocessor means of buffered compressed data during data transfer operations between said optical media data storage system and said host computer.

3. The system of claim 2 wherein said RAM is accessed by input and output pointer means for accessing said RAM with new records being stored at the location indicated by the input pointer, and copied to the optical media storage device means when said RAM is filled to a predetermined degree indicated by said output pointer, whereafter said pointers are updated.

4. An optical media data storage system comprising:

host interface means for connection to a host computer and including means for receiving a sequence of data storage commands to control a magnetic media data storage device from said host computer;

data compression means for compressing data transferred from said host interface to said buffer memory means and for decompressing data transferred from said buffer memory means to said host interface means;

buffer memory means coupled to said data compression means for receiving compressed data to be stored on an optical disk, and for supplying compressed data which has been stored on the optical disk to said data compression means;

optical media storage means, comprising an optical disk for storing compressed data thereon, for storing compressed data received from said buffer memory means and for supplying compressed data stored on said optical disk to said buffer memory means; and microprocessor means for responding to said sequence of commands received from said host interface means and for controlling data storage and retrieval operations of said buffer memory means and said optical media storage means, responsive to said sequence of commands;

wherein all compressed data stored by said optical media storage means is stored in a buffer memory means prior to storage on said optical media storage means and prior to supply of said compressed data from said optical media storage means to said host computer;

wherein while said compressed data is stored in said buffer memory means, prior to storage on said optical media storage means, said compressed data is organized by said microprocessor into discrete groupings or segments, and at least one record directory is constructed, each said record directory consisting of information pertaining to lengths of the compressed data records contained in a single discrete group or segment of compressed data;

wherein data supplied to said host interface means by said host computer is organized into a sequence of records by said microprocessor means; and wherein information pertaining to individual data records which is contained within each said record directory defines the length of at least one record of a single file which includes such records.

5. The system of claim 4 further comprising a high-level directory relating each file to a corresponding record directory or set of record directories is accessed to determine the location or sector address of the corresponding record directory or directories and records on the optical disk each time one or more records from a particular file are sought.

6. The system of claim 5 wherein after said high-level directory has been accessed to determine the location or sector address of the first record directory for a particular file, a quantity of compressed data including at least the particular record directory and a number of the corresponding records located contiguously with respect to said record directory are read from the optical disk by means of the host interface means and copied to the buffer memory, and the information pertaining to the length of each of the records which are stored in the corresponding record directory is employed by the microprocessor means to determine the particular record or records sought by the host computer from the quantity of compressed data copied to the buffer memory.

7. The system of claim 6 wherein said high level directory is stored at a predetermined physical location specified by said microprocessor on said disk.

8. The system of claim 6 wherein said record directories containing data pertaining to each of said records are stored in close physical proximity to the corresponding records on the disk.

9. The system of claim 5 wherein the information stored in said record directories pertaining to each of the records consists of the length of each record.

10. The system of claim 9 wherein a particular record of a sequence of records stored with respect to a given directory is located by counting the number of bytes of data determined in accordance with the record length information, beginning from a known starting point in said sequence of records.

11. The system of claim 4 wherein said records are not of predetermined length.

12. The system of claim 4 wherein said host interface means is connected to said host computer at a host communication port of said host computer adapted for communication with said magnetic media storage device and is adapted to respond to a sequence of data storage commands identical to a sequence of such commands employed by said host computer to communicate with said magnetic media storage device.

13. The system of claim 5 further comprising means for storing information relating to the status of the individual records stored by the optical disk, and to the relationship between successive portions of a single file not stored contiguous to one another on the optical disk.

14. The system of claim 13 wherein said microprocessor means is operatively connected to both said optical media storage device and to said buffer memory means for the purpose of controlling the transfer of said records between said buffer memory means and said optical media storage means.

15. A method for storing compressed data, said compressed data being organized into a sequence of records with associated record directories on an optical media storage device wherein said records are not limited to a specific length, except to the extent that they may not exceed the largest record length value which may be expressed in the embedded directory said system comprising a buffer memory, data compression means, a host interface means, and an optical media storage device, means for connecting the buffer memory to the host interface means and to the optical media storage device, and microprocessor means for controlling the transfer of data therebetween, said method comprising the following steps performed in response to a request from a host computer to store a sequence of records:

receiving said sequence of records at said host interface means and transferring said sequence of records to said data compression means;

compressing said sequence of records at said data compression means;

transferring said sequence of compressed records from said data compression means to said buffer memory means;

storing said sequence of compressed records in said buffer memory means;

creating a record directory in said buffer memory means;

associating a record directory with up to a predetermined number of said compressed records; and storing said sequence of compressed records and said record directory on said optical media storage device; and said method comprising the following further steps performed in response to a request from the host computer for supply of one or more of the stored compressed records;

copying all of the compressed records associated with the record directory with which the particular record or records sought by the host are associated into the buffer memory means;

employing the record directory to locate the particular compressed record or records sought by the host computer;

transferring the compressed record or records sought to the data compression means;

decompressing the records or records sought in the data compression means; and transferring the record or records sought to the host interface means from the data compression means;

transferring the record or records sought to the host from the host interface means.

16. The method of claim 15 wherein said record directory comprises information concerning the lengths of compressed records defined by the number of bytes of data contained within each compressed record.

17. The method of claim 16 comprising the further step of organizing the compressed records into discrete groupings or segments prior to storage on said optical media storage device, said discrete groupings or segments each consisting of the compressed records associated with a particular record directory.

18. The method of claim 17 wherein the particular record sought by the host computer is located in the buffer memory by counting out a number of bytes of data corresponding to the total length of the preceding compressed records from a predetermined starting point.

19. The method of claim 18 wherein the predetermined starting point is the end of the segment stored on the optical media storage device prior to the segment containing the compressed records sought by the host computer.

20. The method of claim 19, wherein all of the compressed records associated with a predetermined record directory pertain to a single user file.

21. The method of claim 20, comprising the further steps of generating a high level directory and accessing same to determine the locations of the record directories associated with compressed records from that file, and copying at least the first of said record directories and the associated compressed records into the buffer memory when a request is received by said system from said host computer by means of said host interface unit for one or more particular records belonging to a particular named user file.

22. The method of claim 20, wherein the high level directory is stored on the optical media storage device at a predetermined location.

23. The method of claim 22, wherein the record directories are stored on the optical media storage device contiguously with the segment of compressed data records to which they contain record length information.

24. The method of claim 15, wherein said optical media storage system will respond to a command of said host directing that a particular record be overwritten with a new version thereof, said response comprising the further steps of storing the new version of the record, and maintaining a list indicating the correspondence between the new and prior versions of the apparently overwritten record.

25. The method of claim 15, wherein said optical media storage system is connected to a host computer at an existing port by which said host conventionally communicates with a magnetic media storage device, and said microprocessor responds to conventional commands received from the host for data storage and retrieval of data on said magnetic media storage device without the need to modify either the host hardware or software by utilizing said system of embedded directories containing information relating to the length of individual compressed records so as to efficiently locate a particular compressed record within a given data segment in response to a series of host commands.

26. A method for storage of a sequence of data records of varying length on an optical disk storage device, said device comprising an optical disk describing a continuous data storage track or a continuous sequence of data storage tracks divided permanently into sectors, whereby said disk is only accessible by associated read/write means at the beginning of said sectors on said tracks, comprising the steps of:

receiving said sequence of data records to be stored from a source thereof, compressing said sequence of data records, and storing the same temporarily in buffer memory means;

generating a record directory associated with up to a predetermined number of said compressed data records, and consisting principally of information concerning the [relative]length of the compressed records associated with the record directory;

generating a high level directory relating one or more record directories to a sequence of compressed data records;

writing said sequence of compressed records to said optical disk in sequence, beginning at one of said sector boundaries, and extending therefrom essentially continuously along said continuous track or continuous sequence of tracks;

writing said record directory to said optical disk contiguously with respect to said sequence of compressed records and at a location fixed with respect to one of said sector and one of said tracks; and writing said sequence of compressed records and said record directories to said disk beginning from one end of the data storage track or tracks and writing said high level directory to said disk beginning from the opposite end of said data storage track.

* * * * *